United States Patent [19]
Manservigi et al.

[11] Patent Number: 5,165,535
[45] Date of Patent: Nov. 24, 1992

[54] CIGARETTE PACKET OF HIGH BIODEGRADABILITY

[75] Inventors: Alberto Manservigi; Antonio Gamberini, both of Bologna, Italy

[73] Assignee: G.D. S.p.A., Bologna, Italy

[21] Appl. No.: 824,389

[22] Filed: Jan. 23, 1992

[30] Foreign Application Priority Data

Jan. 25, 1991 [IT] Italy .............................. 91 A/000021

[51] Int. Cl.⁵ .............................................. B65D 65/46
[52] U.S. Cl. ................................ 206/24.5; 206/524.6; 206/819; 220/DIG. 30; 428/913
[58] Field of Search ............ 206/242, 245, 819, 524.6, 206/524.7; 229/3.5 MF; 220/DIG. 30; 428/913

[56] References Cited

U.S. PATENT DOCUMENTS

| | | |
|---|---|---|
| 3,852,227 | 12/1974 | Matsuda et al. ............ 220/DIG. 30 |
| 4,191,320 | 3/1980 | Taylor et al. ................ 220/DIG. 30 |
| 4,709,808 | 12/1987 | Balduff et al. ....................... 206/819 |
| 5,063,111 | 11/1991 | DiBello ................................ 428/913 |

FOREIGN PATENT DOCUMENTS

| | | |
|---|---|---|
| 2611732 | 9/1988 | France ......................... 220/DIG. 30 |
| 032184 | 7/1981 | Japan .......................... 220/DIG. 30 |

*Primary Examiner*—William I. Price
*Attorney, Agent, or Firm*—Cushman, Darby & Cushman

[57] ABSTRACT

In a conventional cigarette packet with an inner wrapping of tin foil and paper, at least one surface of the tin foil is treated with a photocorrosive substance to the end of enhancing its biodegradability.

1 Claim, 1 Drawing Sheet

CIGARETTE PACKET OF HIGH BIODEGRADABILITY

BACKGROUND OF THE INVENTION

The present invention relates to a cigarette packet featuring high biodegradability.

In particular, the invention relates to a cigarette packet of which the innermost foil-paper wrapping is rendered significantly biodegradable.

Conventionally, cigarette packets comprise a first outer wrapping of transparent airtight material, a second wrapping of paper or cardboard enveloped by the outer wrapping, and internally of the second wrapping, a third wrapping of tin foil and paper directly enveloping a group of cigarettes.

Whilst the paper or cardboard clearly affords good biodegradability, the same cannot be said of the materials constituting the outermost wrapping, and the innermost wrapping which directly envelops the cigarettes.

To the end of enhancing the biodegradability of cigarette packets, the outer transparent wrapping can be fashioned from a biodegradable plastic film of conventional type; conversely, no such solution has been forthcoming hitherto in respect of the tin foil which, in its current form, tends to remain stable over time once utilized and discarded.

The object of the present invention is to provide a cigarette packet of which the inner foil wrapping affords good properties of biodegradability.

SUMMARY OF THE INVENTION

The stated object is realized in a cigarette packet of high biodegradability according to the present invention.

Such a packet is conventional in embodiment, with an inner wrapping of tin foil and paper, but with the additional advantage that at least one surface of the tin foil component of the inner wrapping is treated with a photocorrosive substance to promote degration following disposal of the packet.

BRIEF DESCRIPTION OF THE DRAWINGS

The invention will now be described in detail, by way of example, with the aid of the accompanying sheet of drawings, in which.

DESCRIPTION of the PREFERRED EMBODIMENTS

Figure 1:
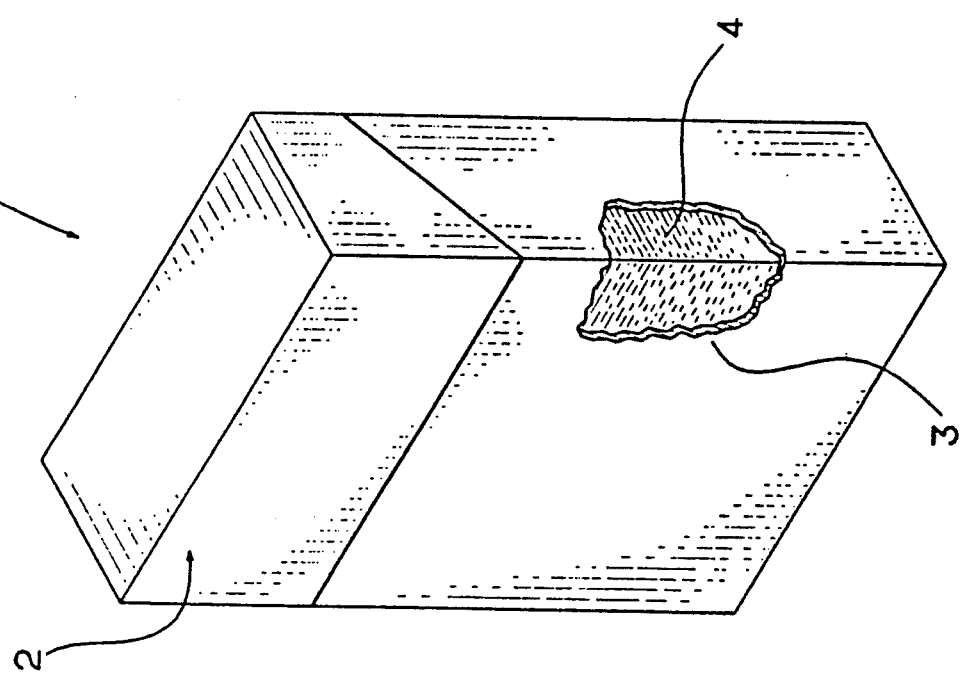

With reference to FIG. 1 of the drawings, 1 denotes a rigid flip-top type of cigarette packet having a hinged lid, in its entirety, which comprises an outer wrapping 2 of transparent material enveloping a rigid container 3 of cardboard, and an inner foil paper wrapping 4 in direct contact with a group of cigarettes (not illustrated).

Figure 2:
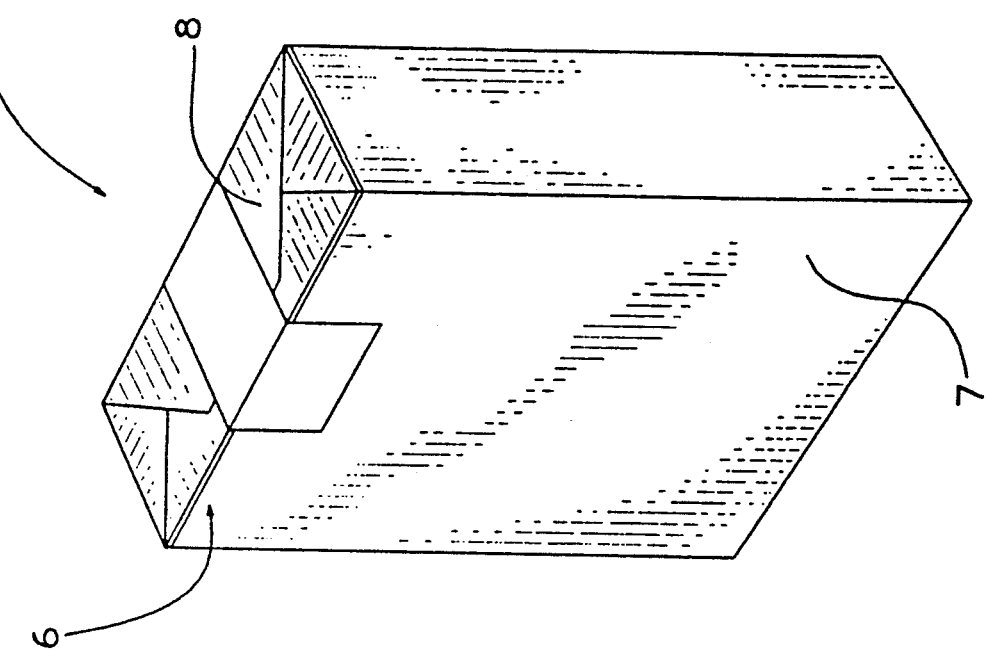
FIG. 1 and FIG. 2 are respective isometrics of a rigid and a crush cigarette packet embodied in accordance with the present invention.

In FIG. 2 of the drawings, 5 denotes a crush type cigarette packet, in its entirety, which comprises an outer wrapping 6 of transparent material, a pliable paper wrapper or label 7 beneath the outer wrapping, and an inner foil paper wrapping 8 in direct contact with a group of cigarettes (not illustrated).

To the end of increasing the biodegradability of the innermost wrapping 4 or 8, the tin foil layer is pretreated by conventional means at least on the exposed surface with a photocorrosive substance which, likewise conventionally, when exposed to sunlight for a certain duration after the packet 1 or 5 has been utilized and discarded, brings about a rapid deterioration of the tin foil.

By way of example, the substance in question might consist in an organic sulphide, a dithiocarbamate, a dithiophosphate, a peroxide, a xanthogenate, or a carbonylic or nitrogenous compound, etc.

Thus, in accordance with the stated object, it will be seen that a cigarette packet 1 or 5 as described and illustrated ca be provided with an inner foil paper wrapping 4 or 8 of good biodegradability.

What is claimed is:

1. A cigarette packet of high biodegradability, comprising an inner wrapping of tin foil and paper, wherein at least one surface of the tin foil component of the inner wrapping is treated with a photocorrosive substance.

* * * * *